US 012043421B2

(12) United States Patent
Cevacins et al.

(10) Patent No.: US 12,043,421 B2
(45) Date of Patent: Jul. 23, 2024

(54) LANDING PAD FOR AERIAL VEHICLES

(71) Applicant: Alarm.com Incorporated, Tysons, VA (US)

(72) Inventors: Olegs Cevacins, Jurmala (LV); Davids Ezers, Liepaja (LV); Ilja Nevdahs, Carnikava (LV)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 17/880,258

(22) Filed: Aug. 3, 2022

(65) Prior Publication Data

US 2023/0045691 A1    Feb. 9, 2023

Related U.S. Application Data

(60) Provisional application No. 63/230,254, filed on Aug. 6, 2021.

(51) Int. Cl.
*B64U 70/99* (2023.01)
*B64U 70/97* (2023.01)

(52) U.S. Cl.
CPC ............. *B64U 70/99* (2023.01); *B64U 70/97* (2023.01)

(58) Field of Classification Search
CPC .... B64F 1/22; B64F 1/222; B64F 1/12; B64F 1/007; B64F 1/00; B64U 70/00; B64U 70/30; B64U 70/99; B64U 80/10; B64U 80/70; B64C 25/32; B64C 2025/345
See application file for complete search history.

(56) References Cited

U.S. PATENT DOCUMENTS

2014/0319272 A1* 10/2014 Casado Magana ..... B60L 50/52
                                                          244/110 E
2017/0096075 A1   4/2017 Henry et al.
2018/0237161 A1*  8/2018 Minnick ............... B64C 39/024
(Continued)

FOREIGN PATENT DOCUMENTS

CN      110406689       11/2019
CN      110844053        2/2020
(Continued)

OTHER PUBLICATIONS

PCT International Search Report and Written Opinion in International Appln. No. PCT/US22/74506, mailed on Nov. 4, 2022, 9 pages.

*Primary Examiner* — Joshua J Michener
*Assistant Examiner* — Arfan Y. Sinaki
(74) *Attorney, Agent, or Firm* — Fish & Richardson P.C.

(57) ABSTRACT

Landing pads for a drone. One of the landing pads can include a landing area with a first surface configured to receive a second surface of a landing gear of a drone; a docking area i) with a first end adjacent to the landing area and a second opposite end and ii) a docking surface configured to contact the second surface of the landing gear of the drone; a fixed member i) with a third surface adjacent to the second end of the docking area and ii) configured to contact an end of the landing gear of the drone; a moveable member configured to i) move the landing gear across the first surface of the landing area onto the docking surface and ii) secure the landing gear of the drone in place between the docking surface of the docking area and the third surface of the fixed member.

18 Claims, 8 Drawing Sheets

(56) References Cited

U.S. PATENT DOCUMENTS

| | | | |
|---|---|---|---|
| 2019/0002128 A1* | 1/2019 | Raz | B64C 39/024 |
| 2019/0023416 A1* | 1/2019 | Borko | B66C 7/08 |
| 2020/0207484 A1 | 7/2020 | Foggia et al. | |
| 2020/0310465 A1* | 10/2020 | Carthew | B64U 10/13 |

FOREIGN PATENT DOCUMENTS

| | | |
|---|---|---|
| EP | 3819215 | 5/2021 |
| RU | 2274695 | 4/2006 |

* cited by examiner

LANDING PAD FOR AERIAL VEHICLES

CROSS-REFERENCE TO RELATED APPLICATION

This application claims the benefit of U.S. Provisional Application No. 63/230,254, filed Aug. 6, 2021, the contents of which are incorporated by reference herein.

TECHNICAL FIELD

This specification generally relates to aerial vehicles and landing pads on which aerial vehicles can land.

BACKGROUND

Unmanned aerial vehicles can be configured as monitoring devices or sensors and are often dispersed at various locations at a property, such as a home or commercial business. These sensors and aerial devices can have distinct functions at different locations of the property.

Some unmanned aerial vehicles (UAVs) at a property are autonomous vehicles or drones that offer different types of monitoring and control functionality. The functionality afforded by these drones can be leveraged to secure items at a property, to obtain information about respective items at multiple different properties, and to visually monitor conditions of items located at the properties.

SUMMARY

This specification describes stations, components, and systems for a landing pad for unmanned, autonomous aerial vehicles ("drones"). The landing pad may prevent unstable sliding of a drone, reduce a need for aggressive maneuvering of the drone during landing, keep a drone stable on a single landing gear, or a combination of two or more of these. The landing pad includes a magnetic landing area, that attracts a landing gear on a drone, and a non-magnetic area from which the drone may take off from the landing pad. The non-magnetic area may be part of a docking area where charging contacts are located. The landing pad can include an actuator that moves a landing gear of a drone from the magnetic landing area to the docking area. The actuator can cause the landing gear to be physically locked in place in the docking area until the drone is ready to take off.

Other implementations of this aspect include corresponding systems, apparatus, and computer programs recorded on computer storage devices, each configured to perform the operations of the methods.

In general, one innovative aspect of the subject matter described in this specification can be embodied in methods that include the actions of a landing area with a first surface configured to receive a second surface of a landing gear of a drone; a docking area i) with a first end adjacent to the landing area and a second opposite end and ii) a docking surface configured to contact the second surface of the landing gear of the drone; a fixed member i) with a third surface adjacent to the second end of the docking area and ii) configured to contact an end of the landing gear of the drone; a moveable member configured to i) move the landing gear across the first surface of the landing area onto the docking surface of the docking area and ii) secure the landing gear of the drone substantially in place between the docking surface of the docking area and the third surface of the fixed member.

In general, one innovative aspect of the subject matter described in this specification can be embodied in methods that include the actions of a landing station configured to mount onto a non-horizontal surface; a landing area i) connected to the landing station and ii) with a first surface configured to receive a second surface of a landing gear of a drone; a fixed member i) connected to the landing station and that ii) includes a third surface near an end of the landing area and iii) is configured to contact an end of the landing gear of the drone; a moveable member i) connected to the landing station and ii) that is configured to a) move the landing gear across the first surface of the landing area and b) secure the landing gear of the drone substantially in place between the first surface of the landing area and the third surface of the fixed member.

Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination.

In some implementations, the landing area is magnetic.

In some implementations, the landing area includes a ferromagnetic material.

In some implementations, the first surface is substantially smooth.

In some implementations, the first surface includes a polyethylene coated surface.

In some implementations, the drone landing pad includes a support frame attached to the landing area, the docking area, the fixed member, and the moveable member.

In some implementations, the landing area and the docking area are substantially planar.

In some implementations, a first size of the docking surface is larger than a second size of the second surface of the landing gear of the drone.

In some implementations, the fixed member includes two or more surfaces that together are configured to guide the landing gear toward a center of the docking area along a latitudinal axis.

In some implementations, the two or more surfaces include two surfaces that intersect at an angle around 130 degrees.

In some implementations, an intersection point of the two surfaces substantially aligns with the center of the docking area along the latitudinal axis.

In some implementations, the fixed member includes one or more charging contacts.

In some implementations, the landing area includes one or more sliding members configured to move the moveable member.

In some implementations, the one or more sliding members include one or more screw shafts.

In some implementations, the landing area includes one or more actuators configured to move the moveable member along the one or more sliding members.

In some implementations, the docking area has a non-planar surface.

In some implementations, the docking area includes a non-magnetic material.

In some implementations, the docking area is configured to rotate the landing gear when in contact with the landing gear so that a second, opposite end of the landing gear substantially aligns with the fixed member.

In some implementations, the docking area is configured to rotate the landing gear when in contact with the landing gear so that each of one or more surfaces included in the second, opposite end of the landing gear are substantially parallel with corresponding surfaces in the fixed member.

In some implementations, the landing station is configured to move between a folded and an unfolded position; the first surface of the landing area is configured to receive the second surface of the landing gear of the drone while the landing station is in the unfolded position; and the moveable member is configured to move the landing gear across the first surface of the landing area while the landing station is in the unfolded position.

In some implementations, the landing station is configured to rotate and slide to move between the folded position and the unfolded position.

In some implementations, the landing station is configured to slide vertically to move between the folded position and the unfolded position.

In some implementations, the landing area includes a docking area i) with a first end adjacent to the landing area and a second opposite end and ii) a docking surface configured to contact the second surface of the landing gear of the drone; and the moveable member is configured to i) move the landing gear across the first surface of the landing area onto the docking surface of the docking area while the landing station is in the unfolded position and ii) secure the landing gear of the drone substantially in place between the docking surface of the docking area and the third surface of the fixed member.

In some implementations, the landing area includes a magnetic material.

In some implementations, the magnetic material is configured to retract away from the first surface to enable the drone landing pad to disengage from the landing gear of the drone.

In some implementations, the first surface of the landing pad includes a substantially flat surface configured to couple with the second surface that is substantially flat.

In some implementations, the landing area is magnetic.

In some implementations, the first surface is substantially smooth.

In some implementations, the first surface includes a polyethylene coated surface.

In some implementations, the fixed member includes two or more surfaces that together are configured to guide the landing gear toward a center of the docking area along a latitudinal axis.

In some implementations, the two or more surfaces include two surfaces that intersect at an angle around 130 degrees.

In some implementations, an intersection point of the two surfaces substantially aligns with the center of the landing area along the latitudinal axis.

In some implementations, the two surfaces are configured to receive the end of the landing gear of the drone that has substantially the same shape as the two surfaces.

In some implementations, the fixed member includes one or more charging contacts.

In some implementations, the landing area includes one or more sliding members configured to move the moveable member.

In some implementations, the one or more sliding members include one or more screw shafts.

In some implementations, the landing area includes one or more actuators configured to move the moveable member along the one or more sliding members.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
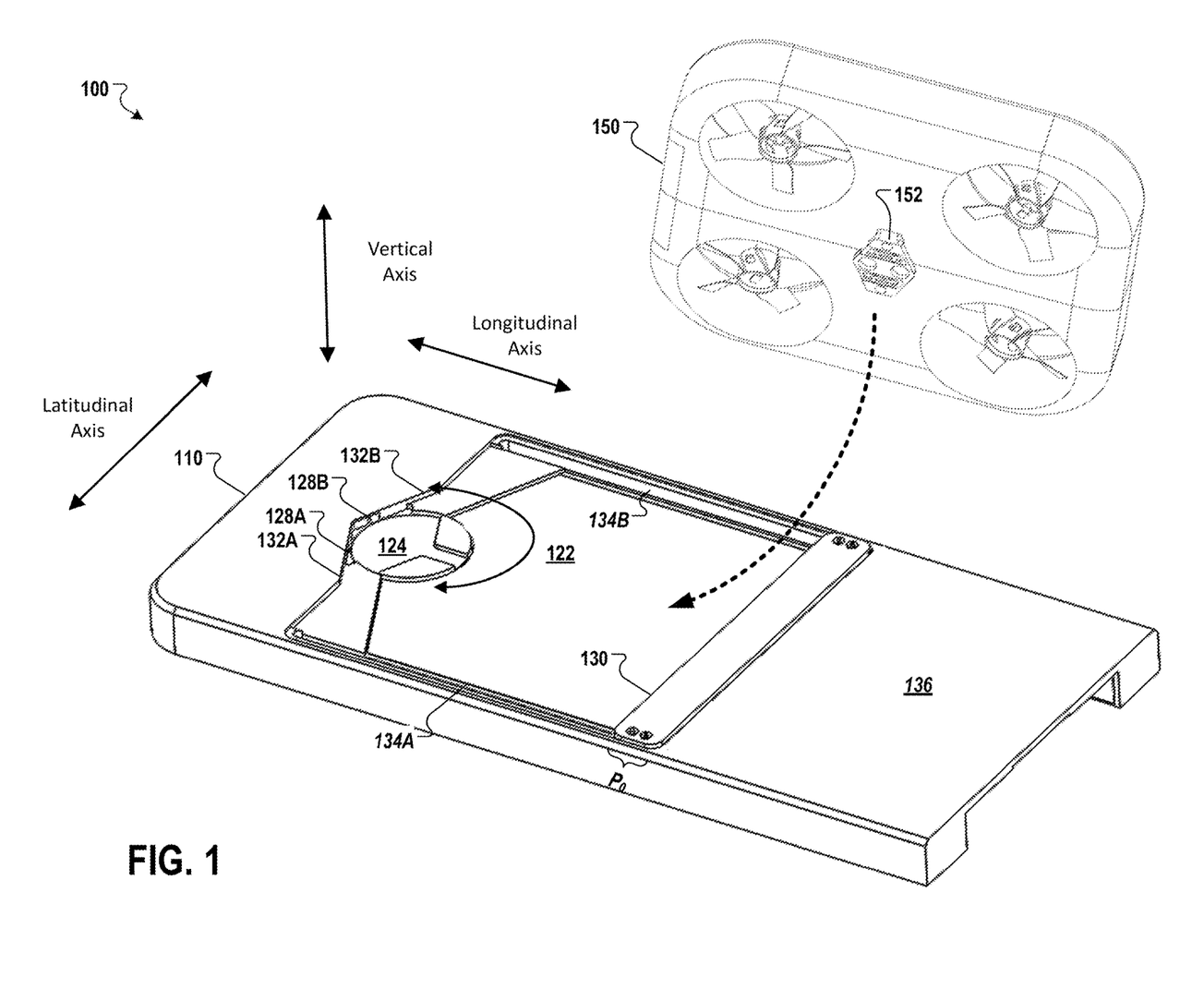
FIG. 1 is a diagram of an example system with a landing pad that magnetically attracts a landing gear of a drone.

FIG. 1 is a diagram of an example system 100 with a landing pad 110 that magnetically attracts a landing gear 152 of a drone 150. The landing pad 110 includes a magnetic landing area 122, a docking area 124, and a movable member 130.

In some implementations, the landing gear 152 is in a center of a bottom of the drone 150. When the drone 150 lands, the landing gear 152 can land on the magnetic landing area 122. After landing, the movable member 130 can push the landing gear 152 to the docking area 124 and physically lock the landing gear 152 in place. When the drone 150 is about to take off, the movable member 130 can move away from the docking area 124, unlocking the landing gear 152 and allowing the drone 150 to take off.

The magnetic landing area 122 can be made of a substantially smooth material on which the landing gear 152 can slide, and the bottom surface of the landing gear can be made of a smooth material so that the landing gear 152 can slide on the magnetic landing area. For example, the magnetic landing area 122 and the landing gear 152 can have flat polyethylene coated surfaces. In some implementations, the material making up the landing area 122 can be an electromagnetic material or a permanent magnet. The landing area 122 can be magnetic in only certain areas. For example, only certain portions can turn on the electromagnet while the drone 150 is landing in order to attract the landing gear. The landing pad 110 can determine a portion of the landing area 122 to which the drone 150 is likely to contact and turn on one or more electromagnets for the portion. When the drone 150 is not landing, the electromagnets can be turned off to save energy.

In some implementations, electromagnets can have varying strengths. For example, the voltage to the electromagnetics can be increased to attract the landing gear 152 to the landing area 122 while the drone 150 is landing. After landing, the voltage to the electromagnetics can be decreased, thus lowering the strength of the magnetic attraction to the landing area 122, e.g., saving power while maintaining contact with the drone 150. With a lower magnetic attraction, the movable member 130 can have less friction to overcome when moving the drone 150 to the docking area 124, thus saving energy.

In some implementations, the magnetic landing area 122 can be made of a ferromagnetic material such as steel such that the landing area 122 is attracted to one or more magnets of the landing gear 152. For example, steel that covers an entirety of a top surface of the magnetic landing area 122 and one or more magnets of the landing gear 152 can attract each other regardless of the polarity of the one or more magnets.

The bottom surface of the landing gear 152 can be flat like the magnetic landing area 122 such that that the magnetic attraction between the landing gear 152 and the magnetic landing area 122 may allow the drone 150 to more easily stay upright after landing. For example, the force of gravity and magnetic attraction can cause the magnetic landing area 122 and landing gear 152 to tightly press against each other, preventing the drone 150 from tipping over.

In some implementations, the landing gear 152 can be made of electromagnetics. For example, the then drone 150 lands, the magnets are turned on. When the drone 150 takes off the electromagnets can be turned on or off to save energy.

In some implementations, the landing gear 152 can be moved on the body of the drone 150. For example, after the drone 150 takes off, the drone 150 can move the landing gear 152 to a more aerodynamic area of the drone 150, or retract the landing gear 152 into a compartment, or both.

In some implementations, the landing gear 152 can have pins, rails, or surfaces used to guide the landing gear 152 into the docking area 124. For example, a particular shape of the landing gear 152 can cause the movable member 130 to mechanically rotate the landing gear 152 to orient the landing gear 152 to the docking area 124.

In some implementations, the landing gear 152 can have pins rails, or surfaces used to guide the landing gear 152 to engage the movable member 130 in a particular orientation. For example, the landing gear 152 can have a sloped edge that causes the landing gear 152 to rotate into a particular orientation when engaged by the movable member 130.

The docking area 124 can be located adjacent to the magnetic landing area 122 and be substantially planar, e.g., level, with the magnetic landing area 122. This can enable the landing gear 152 to more easily slide from the landing area 122 to the docking area 124, from the docking area 124 to the landing area 122, or both.

The docking area 124 can include a non-magnetic area from which the drone 150 can take off with less energy than taking off from the magnetic landing area 122. For example, the drone 150 may need to overcome much more magnetic attractive forces to take off from the magnetic landing area 122 than take off from the non-magnetic area. The non-magnetic area can have a larger top surface area than a surface area of the bottom of the landing gear 152 to allow the landing gear 152 to entirely fit within the non-magnetic area.

In some implementations, the docking area 124 can be located adjacent to the magnetic landing area 122 and be on a different plane than the magnetic landing areas 122 such that the landing gear 152 has to slide up or down from the magnetic landing areas 122 to the docking area 124. For example, the movable member 130 can push the drone 150 by means of engaging the landing gear 152 to the docking area 124. The docking area 124 can be above the landing area 122. This configuration allows the drone 150 to be clear of any obstructions and in a more desirable location for taking off.

In some implementations, the docking area 124 can include one or more fixed members 132A-B, e.g., walls, that can stop the landing gear 152 from sliding farther. For example, the docking area can include two vertical straight walls that intersect at a one hundred thirty degree angle, which correspond to two sides of the landing gear 152 which form a one hundred thirty degree angle. The shape of the walls and the sides of the landing gear 152 can cause force from the movable member 130 to center the landing gear 152 in the docking area 124 along a latitudinal axis. For example, the walls can be angled towards the center of the docking area 124 latitudinally and guide the landing gear 152 to the center of the docking area 124. Accordingly, the drone 150 can be able to land off center from the docking area 124, e.g., along the latitudinal axis, and still be centered with the docking area 124 by movement of the movable member 130.

The angle formed by the fixed members 132A-B can be any appropriate angle. The angle formed by fixed members 132A-B, e.g. the two vertical walls, can vary depending on the friction between fixed members 132A-B and the landing gear 152. The angle formed by fixed members 132A-B can vary based on the force of the actuator 320 that moves the movable member 130. The angle formed by fixed members 132A-B can be less than 180 degrees, preferably around 130 degrees, e.g., when the fixed members 132A-B surround at least a portion of the landing gear 152. The angle formed by the one or more fixed members 132A-B can form a centering point for the landing gear 152. When the fixed members 132A-B are surrounded by at least a portion of the landing gear 152, the fixed members 132A-B can have an angle that is greater than 180 degrees.

In some implementations, the docking area 124 is not included in the landing area 122. For instance, the landing area 122 might not have a non-magnetic area defined by the docking area 124. The landing area 122 without a docking area 124 can have one or more areas in which the drone 150 can charge. For example, the landing area 122 can have one or more wireless charging areas in which the drone 150 can be pushed in order to charge.

In some implementations, the system 100 can include one or more docking areas 124. For example, a large landing area 122 can land and dock multiple drones 150 in multiple docking areas 124.

The docking area 124 can include one or more fixed members 132A-B against which the landing gear 152 engages. The landing gear 152, while in the docking area 124, is in contact with the fixed members 132A-B. The movable member 130 can hold the landing gear 152 in contact with the fixed members 132A-B in order to lock the landing gear 152 in place. The fixed members 132A-B can have a contour that matches the contour of the landing gear 152.

The docking area 124 can include one or more charging contacts 128A, 128B that can be used to charge the drone 150. For instance, the one or more fixed members 132A-B can include the one or more charging contacts 128A-B. The charging contacts 128A-B can be electrically conducive in order to directly transfer electric current. The charging contacts 128A-B can be magnetically inductive in order to inductively transfer electrical energy to the drone 150. In some examples, each of the one or more fixed members 132A-B includes a corresponding one of the one or more charging contacts 128A-B. The charging contacts 128A, 128B of the docking area 124 can come in physical contact with charging contacts on the landing gear 152. When this occurs, the charging contacts 128A-B can charge a battery of the drone 150.

The docking area 124 and the landing gear 152 can include wireless inductive charging components such that when the landing gear 152 is in the docking area 124, the drone 150 can be wirelessly charged by the landing pad 110.

The movable member 130 can be shaped to move the landing gear 152 from where the landing gear 152 lands on the magnetic landing area 122 to the docking area 124. For example, the movable member 130 can slide from a bottom the magnetic landing area 122 to the docking area 124. In some implementations, the movable member 130 may be a flat straight bar that extends lengthwise along an entirety of the magnetic landing area 122.

The movable member 130 can be manufactured from any appropriate material. In some examples, the moveable member is made out of stainless steel. Some examples of moveable member material can include non-ferrous materials or materials with a low coefficient of friction, e.g. smooth materials. Non-ferrous materials can include, plastic, wood, aluminum, composites, fiberglass, or a combination thereof.

In some implementations, the movable member 130 can be one or more members designed to move across the landing area 122 and engage the landing gear 152. For example, two movable member 130 can move from opposite sides of the landing area 122. The two movable member 130 can engage the landing gear 152 from both sides and lock the landing gear 152 in place.

The movable member 130 can attach to one or more slide members 134A-B. The slide members 134A-B can be manufactured from any appropriate type of material. The slide members 134A-B can be configured to enable the movable member 130 to move from a first position $P_0$ at a first end of the landing pad 110 toward a second position $P_1$, shown in FIG. 2 and described in more detail below, at a second end of the landing pad 110 that includes the one or more fixed members 132A-B. By moving along the slide members 134A-B, the movable member 130 can secure the drone 150 in place, e.g., by securing the landing gear 152 between the movable member 130, the docking area 124, and the one or more fixed members 132A-B.

Figure 2:
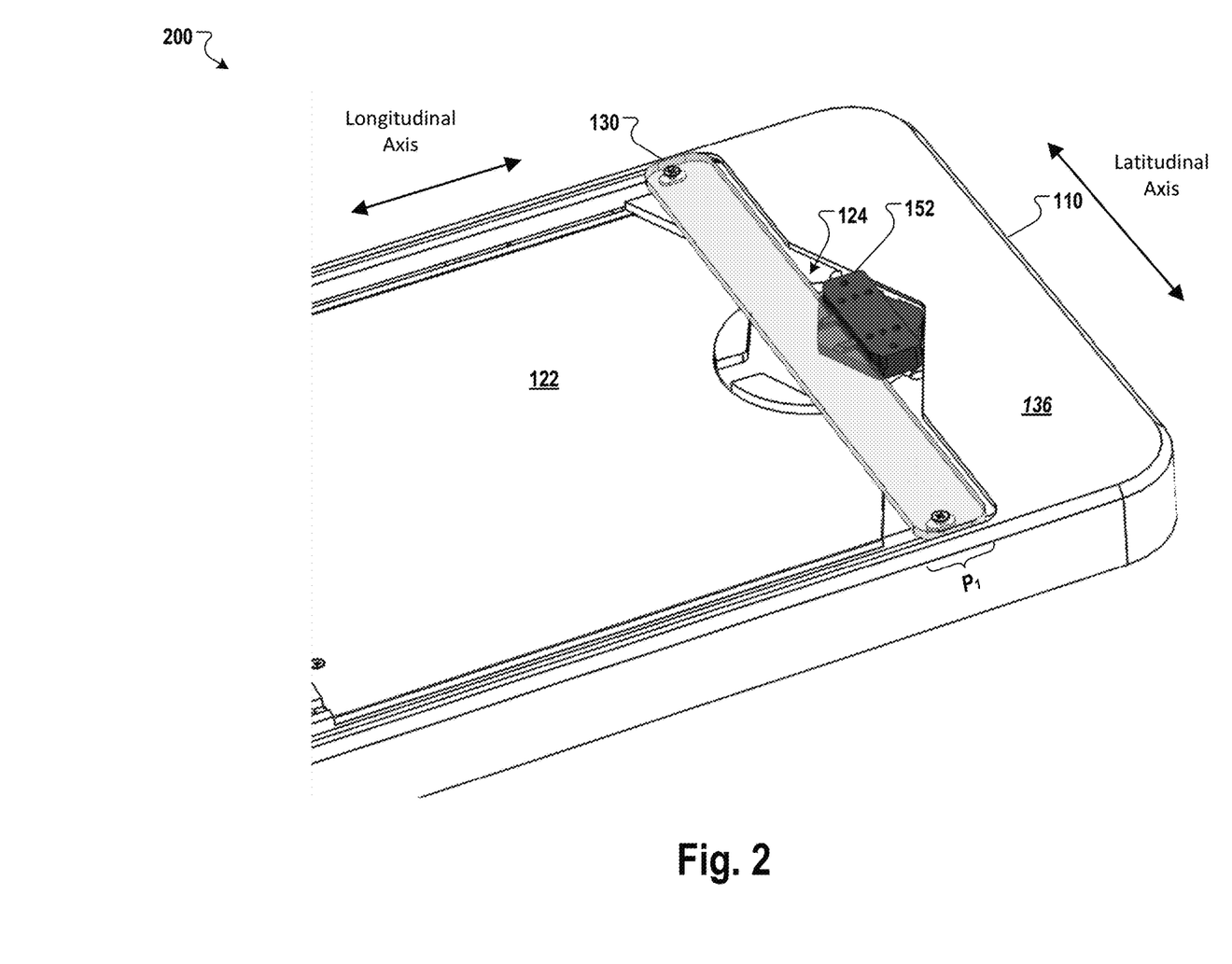
FIG. 2 is a diagram of an example system where a landing gear is locked in place by a landing pad.

FIG. 2 is a diagram of an example system 200 where the landing gear 152 is locked in place by the landing pad 110. The landing gear 152 is shown in the docking area 124, and the movable member 130, at the second position $P_1$, locks the landing gear 152 in place by moving over a portion of the landing gear 152. The portion of the landing gear 152 is sandwiched between the movable member 130 and the docking area 124. When the drone 150 is about to take off, the landing pad 110 may move the movable member 130 away from the landing gear 152 so the portion of the landing gear 152 is no longer sandwiched between the movable member 130 and the docking area 124.

In some implementations, the movable member 130 is not used to lock the landing gear 152 into place. Instead, a separate component, e.g., a clamp or another appropriate component, can engage the landing gear 152 in order to lock the landing gear 152 into place. For example, the landing pad 110 can use the movable member 130 to move a first drone 150 to a first docking area 124 and allow a separate component to lock the landing gear 152 into place. This can allow the movable member 130 to move a second drone 150 to a second docking station 124 included in the landing pad 110.

The landing pad 110 includes a support frame 136 that connects to the landing area 122, docking area 124, one or more fixed members 132A-B, and the one or more slide members 134A-B. For instance, the support frame 136 can include the one or more fixed members 132A-B as walls included in the support frame. The support frame 136 can include a surface that defines the landing area 122, the docking area 124, or both. In some examples, the support frame 136 can include an aperture configured to receive the landing area 122, e.g., when the landing area 122 is manufactured from a material, e.g., a magnetic material, different from a material used to manufacture the support frame 136. The support frame 136 can connect to the one or more slide members 134A-B using one or more bolts or screws. In some examples, the one or more slide members 134A-B can be part of a unitary component that includes the support frame 136.

The landing pad 110 can determine that the drone 150 has landed, or likely landed, on the landing pad 110 in any appropriate manner. In an example, the landing pad 110 has a short range, e.g., Bluetooth, transceiver which communicates with a similar wireless transceiver on the drone 150. For instance, the drone 150 can detect a likely landing event and communicate the likely landing event to the landing pad 110.

The drone 150 detects it has landed using one or more onboard sensors, that can include but are not limited to accelerometers, LIDAR, SONAR, cameras, or a combination thereof. Upon detecting that the drone 150 has landed onto the landing pad 110, the drone 150 can send a message to the landing pad 110. In response to receiving the message, the landing pad 110 can direct movable member 130 to secure the drone 150 between the movable member 130 and the one or more fixed members 132A-B.

In some examples, the drone 150 can sense that it has reached the docking area 124 by detecting voltage from charging contacts 128A-B. In response to detecting the voltage from the charging contacts 128A-B, the drone 150 can send a signal to the landing pad 110 that indicates that the drone 150 has likely landed on the landing pad 110. In response to receipt of the message, the landing pad can turn off the actuator 320 and stop the movable member 130.

In some implementations the landing pad 110 can include one or more sensors such as accelerometers or other motion sensing equipment. The landing pad 110 can use sensor data received from the one or more sensors to determine whether the drone 150 has likely landed on the landing pad 110, e.g., when a change in the sensor data satisfies a change threshold. If the change threshold is satisfied, the landing pad 110 can move the movable member 130 toward the one or more fixed members 132A-B. In this implementation, there is no required communication between the landing pad 110 and the drone 150. If the change threshold is not satisfied, the landing pad 110 can determine that a drone has not likely landed on the landing pad 110 and to maintain the movable member 130 in its current position.

A process for using the landing pad 110 may include determining that the drone 150 has landed on the landing pad 110, based on determining that the drone 150 has landed on the landing pad 110, actuating the movable member 130 to move towards the docking area 124, stopping the movable member 130 at the docking area 124 while the lower portion 420B of the landing gear 152 is locked in place between the docking area 124 and the movable member 130, determining that the drone 150 will take off, and based on determining that the drone 150 will take off, actuating the movable member 130 to move away from the docking area 124 and unlock the landing gear 152. The process may be performed by one or more processors inside the landing pad 110 or one or more processors inside a device that is in communication with the landing pad 110.

Figure 3:
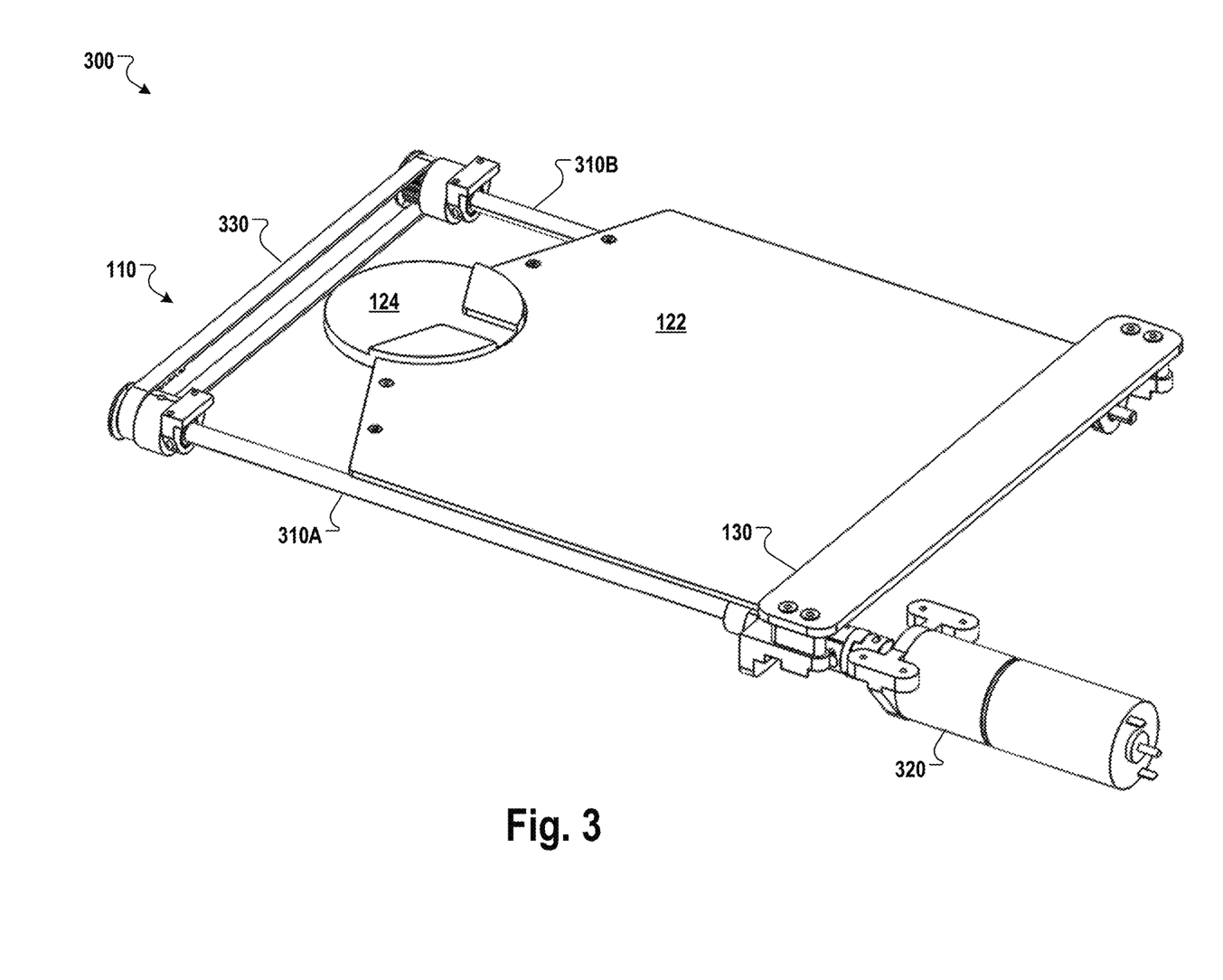
FIG. 3 is a diagram of an example system where an actuator moves a movable member along a landing pad.

FIG. 3 is a diagram of an example system 300 where an actuator 320 moves a movable member 130 along the landing pad 110. For example, the actuator 320 may be a direct current (DC) motor. The actuator 320 may be part of the landing pad 110, and be positioned inside an outer casing of the landing pad 110. The landing pad 110 can include, inside the outer casing, screw shafts 310A, 310B on two sides of the landing pad 110 coupled together via a pulley belt 330. A first screw shaft 310A may be directly connected to the actuator 320, and rotation of the first screw shaft 310A may cause the pulley belt 330 to rotate the second screw shaft 310B with a similar speed and direction.

The screw shafts 310A, 310B may be coupled to the movable member 130, where rotation of the screw shafts 310A, 310B in one direction moves the movable member 130 towards the docking area 124 and rotation of the screw shafts 310A, 310B in another direction moves the movable member 130 away from the docking area 124. For example, counter clockwise rotation of the screw shafts 310A, 310B may move the movable member 130 towards the docking area 124 and clockwise rotation of the screw shafts 310A, 310B may move the movable member 130 away from the docking area 124.

The movable member 130 may be coupled to the screw shafts 310A, 310B such that there is a consistently sized gap between the movable member 130 and the magnetic landing area 122 as the movable member 130 moves along the landing pad 110. For example, the movable member 130 may be positioned 1.1 millimeters (mm) above the magnetic landing area 122 and the docking area 124 no matter how far the movable member 130 is from the docking area 124.

Figure 4A:
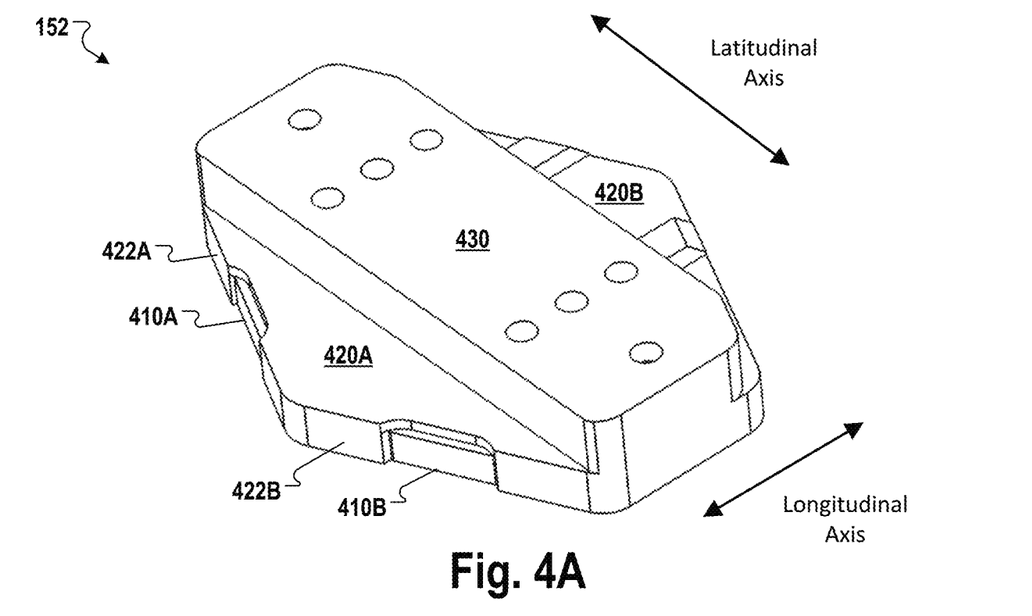
FIGS. 4A and 4B show different views of a landing gear.
Figure 4B:
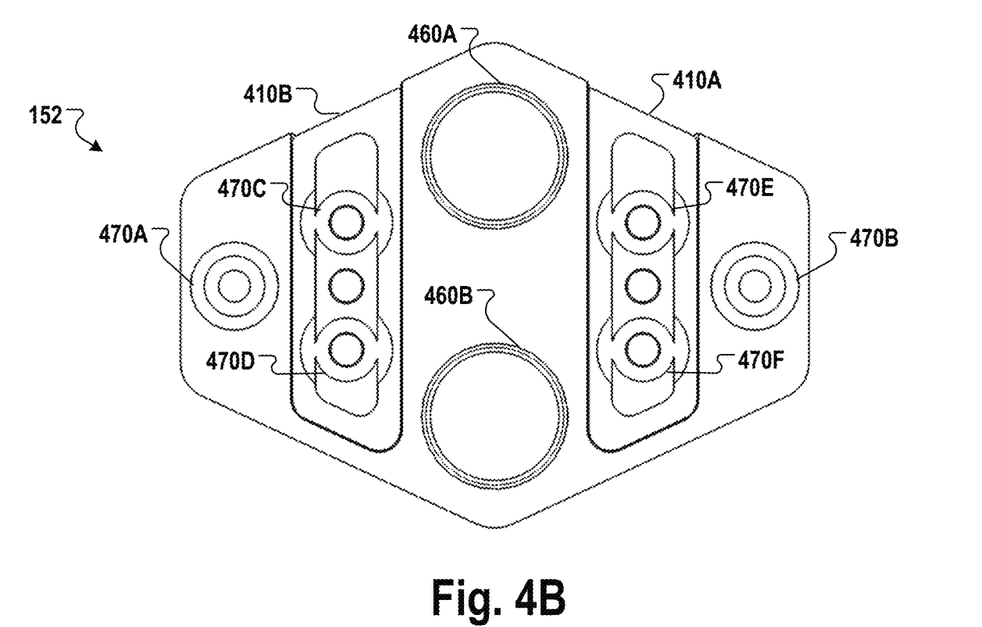

FIGS. 4A and 4B show different views of a landing gear 152. FIG. 4A shows a perspective view of the landing gear 152. The landing gear 152 includes lower portions 420A, 420B and a higher portion 430. The higher portion 430 may be located between the lower portions 420A, 420B, e.g., along a longitudinal axis. The lower portions 420A, 420B may have a height such that the lower portions 420A, 420B fit inside a gap between the movable member 130 and the magnetic landing area 122 of the landing pad 110 shown in FIGS. 1-2. For example, the lower portions 420A, 420B may have a height of 1 mm and the gap between the movable member 130 and the magnetic landing area 122 may be 1.1 mm.

The higher portion 430 may have a height greater than the gap between the movable member 130 and the magnetic landing area 122. For instance, the higher portion 430 can have a height such that the higher portion 430 does not fit between the movable member 130 and the magnetic landing area 122. For example, the higher portion 430 may have a height of 2 mm. Accordingly, the movable member 130 may push against the higher portion 430 to move the landing gear 152 along the landing pad 110.

The landing gear 152 may include charging contacts 410A, 410B that are shaped to physically connect to corresponding charging contacts 128A-B in the docking area 124.

For example, a first charging contact 410A may be positioned in a middle of a first side wall 422A of the lower portion 420A and a second charging contact 410B may be positioned in a middle of a second side wall 422B of the lower portion 420A.

As discussed above, the movable member 130 may be a straight bar such that the bar pushing against the higher portion 430 at a vertical wall formed between the higher portion 430 and the lower portion 420B aligns the landing gear 152 such that the first side wall 422A becomes substantially parallel to a wall of the docking area 124 that includes the charging contact 128B, and the second side wall 422B becomes substantially parallel to a wall of the docking area 124 that includes the charging contact 128A.

In some implementations, the docking area 124 may include a rotation platform that rotates the landing gear 152. The landing gear 152 may initially land where the lower portion 420B is closer to the charging contacts 128 than the lower portion 420A, which has corresponding charging contacts 410. The landing pad 110 may then determine to move the landing gear 152 to the rotation platform, e.g., included in the docking area 124, with the movable member 130, then move back the movable member 130 so the landing gear 152 has room to rotate freely, rotate the landing gear 152 one hundred and eighty degrees with the rotation platform, and then move the movable member 130 to push the landing gear 152 against the charging contacts 128. The rotation platform may be helpful where the drone 150 lands facing a wall and is rotated one hundred and eighty degrees to have a frontal facing camera of the drone 150 rotate from facing the wall to facing an interior of a room to provide continued surveillance of the room.

In some implementations, the landing pad 110 might not include a rotation platform and the drone 150 may rotate itself with its propellers so that the lower portion 420A with the charging contacts 410 becomes closer to the charging contacts 128 than the lower portion 430B. For example, the landing pad 110 may push the landing gear 152 to the non-magnetic area, the movable member 130 may then pull back so that the landing gear 152 may rotate, the drone 150 may then spin propellers to rotate the landing gear 152 one hundred and eighty degrees, and the landing pad 110 may then move the movable member 130 to push the landing gear 152 against the charging contacts 128.

In some implementations, the landing pad 110 may determine that the drone 150 is in the non-magnetic area and needs to be rotated. In response, the landing pad 110 may instruct the drone 150 to begin rotating with the drone's propellers and the drone 150 may then determine the drone 150 is done rotating and instruct the landing pad 110 to continue moving the movable member 130 to lock the landing gear 152 against the charging contacts 128.

The drone 150 may determine whether the landing gear 152 should be rotated based on determining whether the charging contacts 410 are facing the charging contact 128. For example, the drone 150 may determine from video or a compass that the drone 150 is facing in a direction where the landing gear 152 charging contacts 410 are not facing the charging contact 128A-B. The drone 150 may then instruct the landing pad 110 to rotate the landing gear 152, or determine to rotate itself with its propellers.

In some implementations, the drone 150 can rotate in order to store conveniently or safely. For example, the drone 150 can rotate into a position that allows the sliding member 130 can lock the landing gear 152 and therefore the drone 150 into place. With the drone 150 locked in place, the landing pad 110 can then be moved into a storage position.

In some implementations, the drone 150 can rotate in order to prepare for the next take off. For example, the drone 150 can land on the landing pad 110 facing the wall or the corner of a room. In order to prepare the drone 150 for taking off in a direction with fewer obstacles, the drone 150 can rotate to face a more desirable direction for takeoff.

FIG. 4B shows a bottom view of the landing gear 152. The bottom side of the landing gear 152 includes magnets 460A, 460B, and mounting holes 470A-470F. The magnets 460A, 460B may be two circular magnets, where a first magnet 460A is closer to a first lower portion 420A and a second magnet 460B is closer to a second lower portion 420B. The magnets 460A, 460B may be arranged in a line along a center axis of the landing gear 152. The mounting holes 470A-470F may receive screws to couple the landing gear 152 to the drone 150. For example, sharp ends of a screws may be threaded through the mounting holes 470A-470F into the drone 150.

Figure 5A:
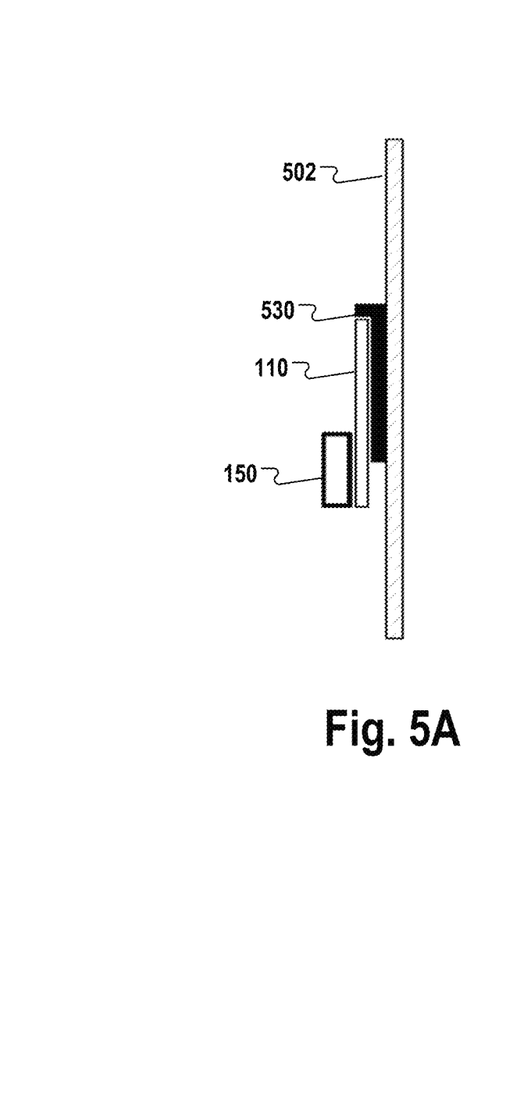
FIGS. 5A and 5B show a landing pad folded and unfolded, respectively.
Figure 5B:
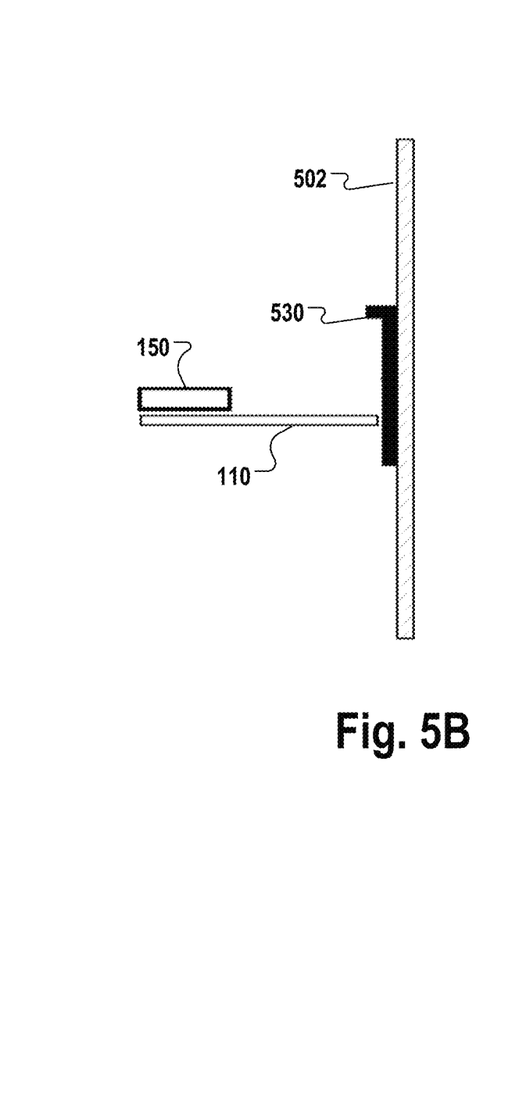

FIGS. 5A and 5B show a landing pad 110 folded and a landing pad unfolded, respectively. The landing pad 110 may be coupled to a landing station 530 that is mounted on a wall 502. The landing pad 110 may be unfolded when the drone 150 is landing or taking off, and otherwise folded to reduce an amount of space taken up by the landing pad 110. Unless indicated otherwise, the reference numbers in FIGS. 5A-B can refer to similar components as those described with reference to FIGS. 1-2, above. For instance, the landing pad 110 of FIGS. 5A-B can include one or more of the components described with reference to FIGS. 1-2 in addition to the landing station 530.

In some examples, landing pad 110 can maintain the folded or unfolded position given an armed state of a property in which the landing pad 110 is located, an alert status of the property, an occupancy status of the property, other appropriate data, or a combination of these. The property can be a residential property or a business. The landing pad 110 can be located in a building or outside a building. For instance, the landing pad 110 can be in the folded position when a security system at the property is in an unarmed state, when there is not an active alert, when the occupancy of the property satisfies a threshold occupancy, e.g., has one or more people in it, or a combination of these. The landing pad 110 can be in the unfolded state when the security system at the property is in an armed state, when there is an active alert, when the occupancy of the property does not satisfy the threshold occupancy, e.g., when no one is at the property, or a combination of two or more of these.

For instance, the drone 150 takes off, and the landing pad 110 remains unfolded, e.g. perpendicular to the wall, when the drone is airborne. For example, the drone can be used to patrol the house when there is nobody home. In this scenario, the unfolded landing pad 110 is not in the way of the home owner.

In some examples, if the property owner is away and the security system is armed, then the landing pad 110 remains folded, e.g. parallel to the wall, with the drone 150 locked onto the landing pad 110. If the system detects an intrusion by security sensors, the landing pad 110 unfolds and releases the drone 150. The drone 150 performs a mission lasting approximately 10-20 minutes. When the drone 150 returns to the landing pad 110 and lands, the landing pad 110 manipulates the drone 150 into docking area 124 and folds itself into folded position, e.g. parallel to the wall.

The landing pad 110 of FIGS. 5A-B can be configured to couple to the drone 150 in both the folded and unfolded position. For instance, the drone 150 can initially connect to the landing pad 110 while the landing pad 110 is in the unfolded position. Once the landing pad 110 determines that the drone 150 is likely securely connected to the landing pad 110, the landing pad 110 can move to the folded position.

In some examples, the landing pad 110 can include a microcontroller The microcontroller can be a programmable electronic component. The microcontroller can be configured to sense that the drone 150 is in contact with the charging contacts 128A-B. The microcontroller can also be configured to use one or more sensors to detect whether the drone has landed on the landing pad 110. The microcontroller can then act in accordance with programing to send instructions to move the movable member 130 and reposition the drone 150 from the landing pad 110 to the docking 124.

The landing pad 110 can include an actuator to lower the landing pad 110 from the folded position to the unfolded position. For example, the user can push a physical button or send a command from an electronic device to unfold the landing pad 110. Once unfolded, the user can conduct maintenance or install the drone 150 onto the landing pad 110.

The movable member 130 may lock the landing gear 152 of the drone 150 in place so when the landing pad 110 is folded the drone 150 does not fall off the landing pad 110. For example, the movable member 130 can lock the landing gear 152 into place. With the landing gear 152 locked in place, the landing pad 110 can move vertically or rotate in a direction that is more compact. In some implementations, the landing pad 110 folds down and vertically against the wall. In some implementations the landing pad 110 retracts horizontally into an enclosure. IN some implementations, the landing pad 110 folds vertically and retracts horizontally.

In some implementations, the landing station 530 can include a localization marker that is covered when the landing pad 520 is folded and uncovered when the landing pad 520 is folded out. The drone 150 can use the localization marker when docking with the landing pad 110. For example, the localization marker can be a visual marker that the drone 150, equipped with a camera, can use object recognition on images captured by the camera to find. The drone 150 can use the object recognition to better navigate and more precisely land on the landing pad 110.

Figure 6A:
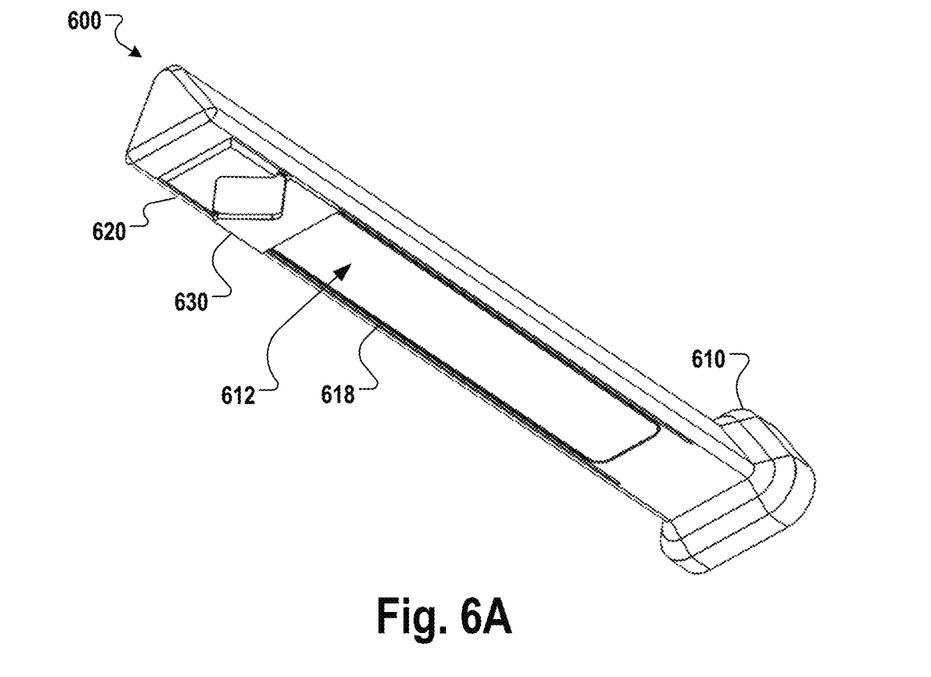
FIGS. 6A and 6B show a wall mounted landing station.
Figure 6B:
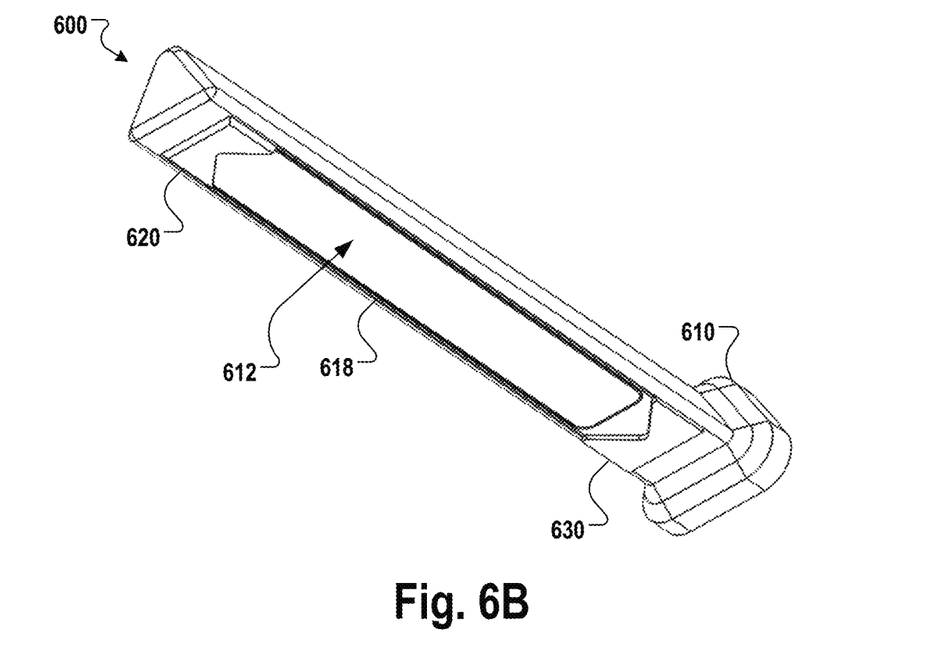

FIGS. 6A and 6B show a wall mounted landing station 600 in a lock and unlock position, respectively. A wall mounted landing station 600 that is mounted near a ceiling may provide various advantages. One advantage of a wall mounted landing station 600 may be more safety from pets, kids, or other robots operating on the ground. Another advantage may be that the wall mounted landing station 600 gives a higher vantage place for drones while the drones are docked and providing capturing video. In yet another advantage, a wall mounted landing station may allow a drone to have its landing gear on the top of the drone, which may reduce interference with the outflow of the drone's propellers and increase propulsion efficiency of the drone.

A wall mounted landing station 600 may include a mount 610 that couples the wall mounted landing station 600 to a wall and a landing pad 612 on an underside of the wall mounted landing station 600. The landing pad 612 may be similar to the landing pad 110 described above, having a magnetic landing area 618 similar to the magnetic landing area 122, a docking area 620 similar to the docking area 124 and a movable member 630 similar to the movable member 130.

The movable member 630 may similarly move a landing gear of a drone from the magnetic landing area 618 to the docking area 620. The landing gear of the drone may be similar to the landing gear 152, in having lower portions that fit between the movable member 630 and the magnetic landing area 618, higher portions that do not fit between the movable member 630 and the magnetic landing area 618, one or more magnets, and charging contacts, and different in that the landing gear is located on a top of the drone.

The angle formed by the walls of the docking area 620 can be an appropriate angle. The angle formed by the walls of docking area 620, can vary depending on the friction between walls of the docking area 620 and the landing gear 152. The angle formed by the walls of the docking area 620 can vary based on the force of the actuator that moves the movable member 630. The angle formed by the walls of the docking area 620 can be less than 180 degrees, preferably around 130 degrees, e.g., when the fixed members 132A-B surround at least a portion of the landing gear 152. The angle formed by the walls of the docking area 620 can form a centering point for the landing gear 152. When the fixed members 132A-B are surrounded by at least a portion of the landing gear 152, the fixed members 132A-B can have an angle that is greater than 180 degrees.

Similarly to as described above for the landing pad 110 and the drone 150, the magnetic landing area 618 of the landing pad 612 may be magnetically attracted to one or more magnets in a landing gear on a top of a drone. After the drone determines that the landing gear on the top of the drone has a stable magnetically held contact with the magnetic landing area 618, the drone may turn off its propellers and instruct the landing pad 612 to move the movable member 630 towards the docking area 620. The movement of the movable member 630 may move the movable member 630 over a portion of the landing gear, push the landing gear into the docking area 620, and lock the drone in place.

In some implementations, the docking area 620 may be formed of a non-magnetic material on an outside and include a movable magnet or electromagnet on the inside. The movable magnet or electromagnet may magnetically hold the landing gear in place until the drone is ready to take off.

In the case of a movable magnet, the landing pad 612 may keep the movable magnet near the bottom surface so that a distance between any landing gear and the movable magnet is smaller, which results in stronger magnetic attraction that keeps the drone attached to the landing pad 612. When the drone is ready to take off, the landing pad 612 may retract the movable magnet inwards farther away from the bottom surface and the landing gear, which reduces the magnetic attraction and allows the drone to drop off the landing pad 612 and fly away. In the case of an electromagnetic, the landing pad 612 may similarly turn on the electromagnet when the drone is to stay on the landing pad 612 and turn off the electromagnet, or switch a polarity of the electromagnet, when the drone is to take off.

Figure 7A:
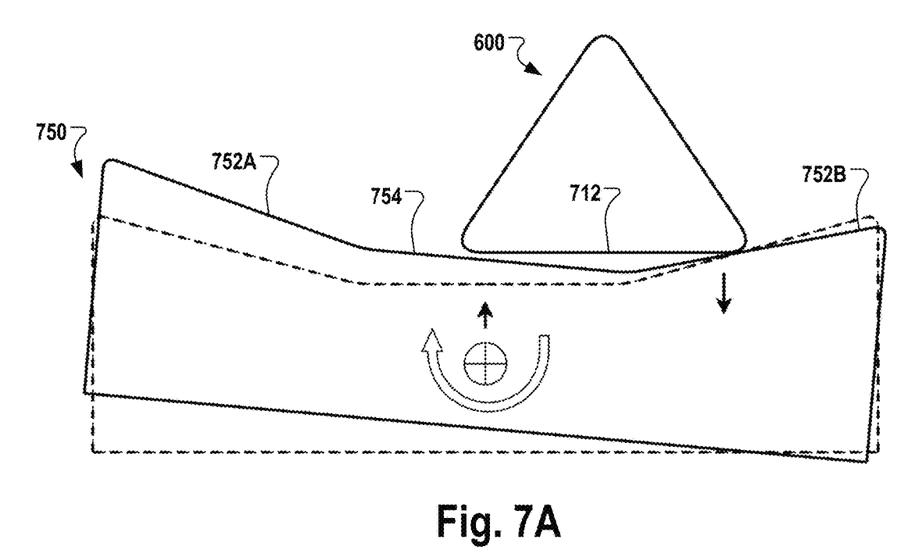
FIGS. 7A and 7B show a drone landing on the wall mounted landing station.
Figure 7B:
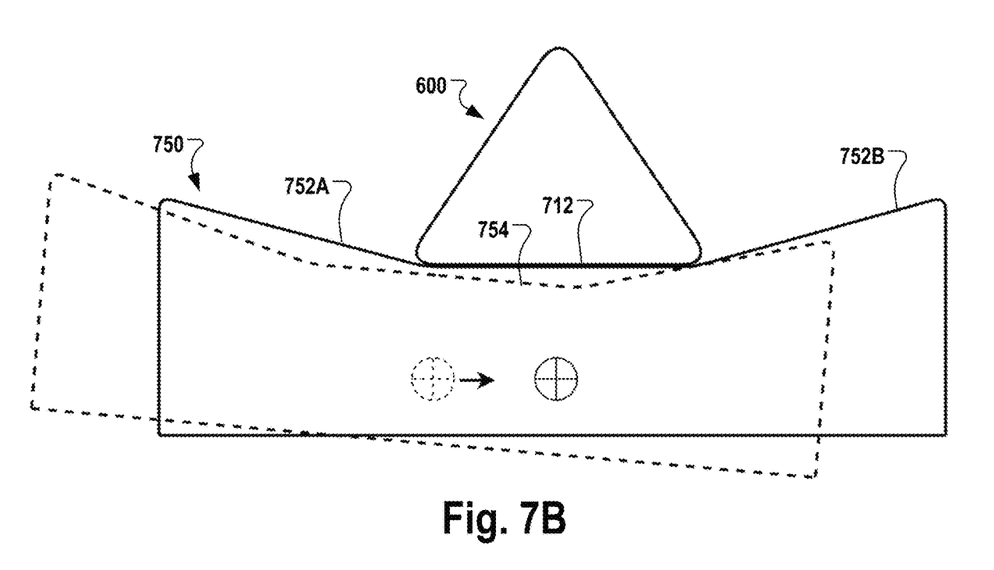

FIGS. 7A and 7B show a drone 750 landing on the wall mounted landing station 600, e.g., as described with reference to FIGS. 6A-B. The bottom 712, e.g., substantially flat bottom, of the mounted landing station 600 and the top of the drone 750 may have corresponding shapes so that upwards force by the drone 750 centers the drone 750 with the mounted landing station 600. For example, the mounted landing station 600 may have a bottom 712 and the top of the drone may have a center portion 754 and two side angled portions 752A, 752B. The bottom portion 712 and the center portion 754 can be substantially flat. As described above, the bottom 712 of the mounted landing station 600 may include the landing pad 612. The landing gear of the drone may form at least a portion of the center portion 754.

The two side angled portions 752 and the center portion 754 of the drone 750 may form a concave shape that receives the mounted landing station 600. For example, the two side angled portions 752 may form one hundred thirty degree angles with the center portion 754, and the bottom 712 of the mounted landing station 600 may have a same width as the center portion 754 of the drone 750.

As shown in FIG. 7A, if the drone 750 is initially off center to the left of the mounted landing station 600, the side angled portion 752B may be pushed down by contact with the mounted landing station 600 and the center flat portion 754 may continue upwards, which causes the drone 750 to roll clockwise. As shown in FIG. 7B, after the center flat portion 754 rolls clockwise into contact with the mounted landing station 600, upwards force of the side angled portion 752B on the flat bottom 712 causes the drone 750 to move to the right and become centered with the mounted landing station 600.

Figure 8A:
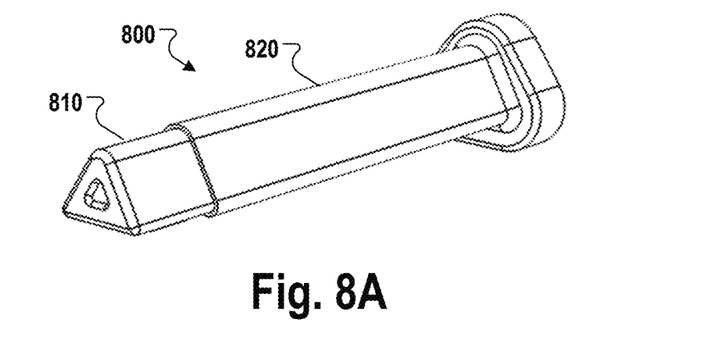
FIGS. 8A and 8B show a wall mounted landing station unextended and extended, respectively.
Figure 8B:
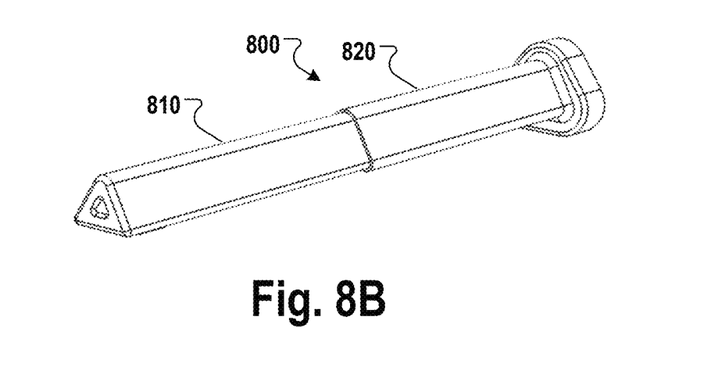

FIGS. 8A and 8B show a mounted ground station 800 unextended and extended, respectively. The mounted ground station 800 may be similar to the ground station 710, but be able to extend from the wall. The mounted ground station 800 may include an extendable portion 810 and a fixed portion 820. The extendable portion 810 may be the portion that moves farther from the wall than the fixed portion 820. The extendable portion 810 may include the landing pad on an underside, e.g., as described with reference to FIG. 1-2 or 6A-B. For example, the extendable portion 810 may include the landing pad 612 on the underside.

The mounted ground station 800 may be unextended while a drone is not taking off or landing, and may be extended while a drone is taking off or landing. Having an extendable portion 810 may allow a drone to couple with the mounted ground station 800 farther from the wall, which may reduce wall effect and increase flight stability.

The mounted ground station 800 may receive an indication from the drone that the drone is going to couple on the mounted ground station 800 and, in response, use a motor in the mounted ground station 800 to extend the extendable portion 810. The mounted ground station 800 can move a movable magnet in the docking area closer to the bottom surface of the landing pad 612 when the drone is going to couple with the mounted ground station 800. The mounted ground station 800 may then receive an indication that the drone is magnetically coupled to the landing pad 612 and, in response, move the movable member 630 to lock the drone in place.

Once the drone is locked in place, the mounted ground station 800 can retract the extendable portion 810 at least partially into the fixed portion 820. This can protect the drone from objects further away from the wall to which the mounted ground station 800 is attached.

Figure 9:
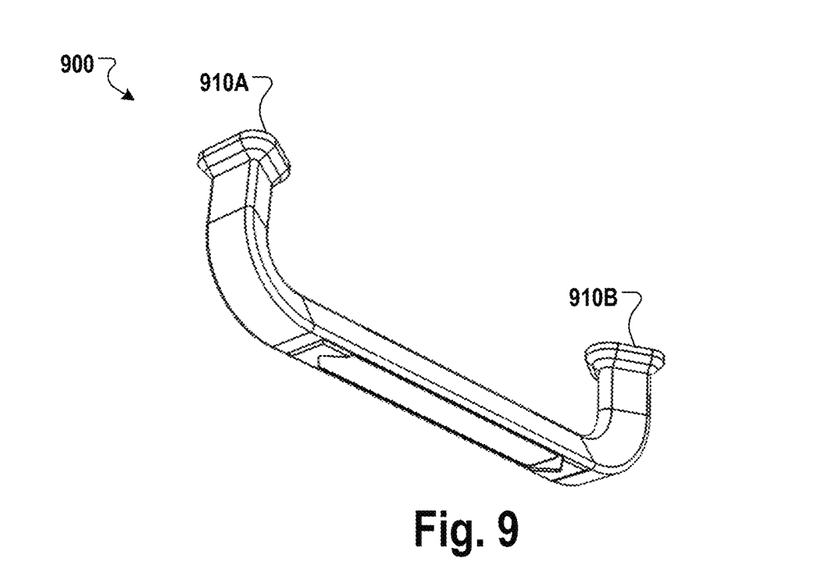
FIG. 9 shows a ceiling mounted landing station.

FIG. 9 shows a ceiling mounted ground station 900. The ceiling mounted ground station 900 may be similar to the mounted landing station 600 except that the ceiling mounted ground station includes two mounts 910A, 910B for attaching to a ceiling. The underside of the ceiling mounted ground station 900 may similarly include a landing pad. For example, the ceiling mounted ground station 900 may include the landing pad 612 on the underside. Mounting the ground station on the ceiling may make any drones that couple with the mounted ground station 900 inaccessible to pets, kids, or robots operating on the ground.

Although the examples describe some of the landing pads or ground stations connecting to a wall, the landing pads or ground stations can connect to any other appropriate type of surface, such as a tree, a post, or a railing.

While this specification contains many specific implementation details, these should not be construed as limitations on the scope of what may be claimed, but rather as descriptions of features that may be specific to particular embodiments. Certain features that are described in this specification in the context of separate embodiments can be implemented in combination in a single embodiment. Conversely, various features that are described in the context of a single embodiment can be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Thus, though particular embodiments of the subject matter have been described. These, and other embodiments, may fall within the scope of the following claims.

The invention claimed is:

1. A drone landing pad comprising:
a landing area with a first surface configured to receive a second surface of a landing gear of a drone, the landing gear of the drone having a contoured portion;
a docking area i) with a first end adjacent to the landing area and a second opposite end and ii) a docking surface configured to contact the second surface of the landing gear of the drone;
a fixed member i) with a third surface adjacent to the second end of the docking area and ii) configured to contact an end of the landing gear of the drone, wherein the fixed member comprises one or more charging contacts; and
a moveable member spaced apart from the docking area and configured to i) move the landing gear across the first surface of the landing area onto the docking surface of the docking area and ii) secure the contoured portion of the landing gear of the drone substantially in place between the moveable member and both a) at least a portion of the docking surface of the docking area and b) the third surface of the fixed member.

2. The drone landing pad of claim 1, wherein the landing area is magnetic.

3. The drone landing pad of claim 1, wherein the landing area comprises a ferromagnetic material.

4. The drone landing pad of claim 1, wherein the first surface is substantially smooth.

5. The drone landing pad of claim 1, wherein the first surface comprises a polyethylene coated surface.

6. The drone landing pad of claim 1, further comprising a support frame attached to the landing area, the docking area, the fixed member, and the moveable member.

7. The drone landing pad of claim 1, wherein the landing area and the docking area are substantially planar.

8. The drone landing pad of claim 1, wherein the fixed member comprises two or more surfaces that include the third surface and together are configured to guide the landing gear toward a center of the docking area along a latitudinal axis.

9. The drone landing pad of claim 1, wherein the fixed member comprises two surfaces that include the third surface and that intersect at an angle around 130 degrees and are configured to guide the landing gear toward a center of the docking area along a latitudinal axis.

10. The drone landing pad of claim 9, wherein an intersection point of the two surfaces substantially aligns with the center of the docking area along the latitudinal axis.

11. The drone landing pad of claim 9, wherein the two surfaces are configured to receive the end of the landing gear of the drone that has substantially a same shape as the two surfaces, the end of the landing gear of the drone having two surfaces that intersect at an angle around 130 degrees.

12. The drone landing pad of claim 1, further comprising a drive system, the drive system comprising one or more slide members configured to enable the moveable member to move.

13. The drone landing pad of claim 12, wherein the one or more sliding members comprise one or more screw shafts.

14. The drone landing pad of claim 12, wherein the drive system comprises one or more actuators configured to move the moveable member along the one or more slide members.

15. The drone landing pad of claim 1, wherein the docking area has a non-planar surface.

16. The drone landing pad of claim 1, wherein the docking area comprises a non-magnetic material.

17. The drone landing pad of claim 1, wherein the docking area is configured to rotate the landing gear so that, when in contact with the landing gear, the landing gear substantially aligns with the fixed member.

18. The drone landing pad of claim 11, wherein the docking area is configured to rotate the landing gear about an axis orthogonal to a latitudinal axis and a longitudinal axis of the docking area so that a second, opposite end of the landing is substantially parallel with corresponding surfaces in the fixed member.

* * * * *